United States Patent
Miyata

(10) Patent No.: US 7,528,905 B2
(45) Date of Patent: May 5, 2009

(54) LIGHT POLARIZING FILM, A METHOD OF CONTINUOUSLY FABRICATING SAME, AND REFLECTIVE OPTICAL DEVICES USING SAME

(75) Inventor: Seizo Miyata, Nishi-Tokyo (JP)

(73) Assignees: Siezo Miyata, Tokyo (JP); Koei Shoji Limited Company, Tokyo (JP)

(*) Notice: Subject to any disclaimer, the term of this patent is extended or adjusted under 35 U.S.C. 154(b) by 793 days.

(21) Appl. No.: 10/986,081

(22) Filed: Nov. 12, 2004

(65) Prior Publication Data
US 2005/0105018 A1  May 19, 2005

(30) Foreign Application Priority Data
Nov. 14, 2003  (JP) .............................. 2003-386010

(51) Int. Cl.
*G02F 1/1335* (2006.01)
(52) U.S. Cl. ............................................. 349/96; 349/5
(58) Field of Classification Search ................ 349/5, 349/96
See application file for complete search history.

(56) References Cited

U.S. PATENT DOCUMENTS
6,714,350 B2 * 3/2004 Silverstein et al. .......... 359/486

FOREIGN PATENT DOCUMENTS
| JP | 5-19247 | 1/1993 |
| JP | 9-90122 | 4/1997 |
| JP | 2001-74935 | 3/2001 |
| JP | 2002-22966 | 1/2002 |

* cited by examiner

Primary Examiner—Richard H Kim
(74) Attorney, Agent, or Firm—Kratz, Quintos & Hanson, LLP

(57) ABSTRACT

There are provided a light polarizing film of a grid type, usable for light at a wavelength in a range of a visible light region to an infrared region, and a method of continuously fabricating the same. A PET film 12 was fed via rolls 13, and a mixed liquid containing poly (vinyl alcohol), formaldehyde, ZnO whiskers after metal treatment, and water was applied to the surface of the PET film to a predetermined thickness with the use of a T-die 14, subsequently executing coating while applying shearing stress by varying peripheral velocity of an upper roll 16 of biaxial rolls from that of a lower roll 16' thereof, whereupon the ZnO whiskers were oriented in the longitudinal direction of the film. Thereafter, the film was dried and cured through a constant temperature cell 17 kept at a predetermined temperature, and rolls 18 to be subsequently taken up by a take-up roll 19. The light polarizing film obtained was found very high in polarized light reflection property in an infrared region of a wavelength in a range of 1 to 10 μm, and upon measurement of reflectance for two sheets of the light polarizing films crossed at right angles, infrared light reflectance thereof was found at 99%.

15 Claims, 3 Drawing Sheets

LIGHT POLARIZING FILM, A METHOD OF CONTINUOUSLY FABRICATING SAME, AND REFLECTIVE OPTICAL DEVICES USING SAME

FIELD OF THE INVENTION

The invention relates to a light polarizing film, a method of continuously fabricating the same, and a reflective optical device using the same, and more particularly, to a light polarizing film of a grid type, fabricated by use of rolling techniques, usable for light at a wavelength in a range from a visible light region to an infrared region, a method of continuously fabricating the same, and a reflective optical device using the light polarizing films.

BACKGROUND OF THE INVENTION

As for a method of fabricating a film-like light polarizing device, there have so far been known three kinds of methods. A first method is a method of doping a poly(vinyl alcohol) (PVA) film as drawn with a dichromic dye such as iodine, and so forth, as disclosed in JP-05-019247A {para (0008)}. This is a method whereby a PVA film with a dichromic substance, such as an iodine complex, adsorbed thereto is passed between rotating rollers to undergo uniaxial drawing while being heated, thereby aligning PVA molecules as well as the iodine complex. The film-like light polarizing device of such a makeup as described permits a light component having an oscillation plane orthogonal to a film-drawing direction to pass therethrough, absorbing a light component having an oscillation plane parallel with the film-drawing direction to be thereby lost, so that two sheets of the film-like light polarizing devices superimposed one on another appear black because the light components having all the oscillation planes are absorbed. The light polarizing film fabricated by the first method is inexpensive, and is excellent in light quenching ratio, so that it is in widespread use in the current liquid crystal display device, and so forth, however, the application region thereof is limited to the visible light region.

A second method of fabricating a film-like light polarizing device is a method of dispersing two kinds of polymers or inorganic fine particles into a polymer to be subsequently subjected to uniaxial drawing as disclosed in JP-2002-022966A {Claims, para (0033) to (0043)}. This is, for example, a method of causing respective refractive indexes of mixed substances to coincide with each other in a drawing direction while causing a refractive index difference $\Delta n$ as large as possible to occur in a direction orthogonal to the drawing direction. In this case, in contrast with the method described, the refractive index difference $\Delta n$ may be enlarged in the drawing direction while the refractive index difference in the direction orthogonal to the drawing direction may be rendered as $\Delta n=0$. In either case, ideally the refractive index difference $\Delta n$ in one direction is rendered as large as possible, that is, not less than 0.5 while the refractive index difference $\Delta n$ in the other direction is rendered $\Delta n=0$, however, it is extremely difficult to find out such a condition. Accordingly, with the second method of fabricating the light polarizing film, a light polarizing film small in area can be fabricated, but if there occurs a slight difference in localized drawing ratio, a refractive index difference $\Delta n$ in a portion comes to differ from that in other portions, resulting in weakened light polarizing function. Further, in order to obtain predetermined light polarizing performance, there is the need for increasing the thickness thereof, which makes it difficult to obtain a high-performance light polarizing film small in thickness.

Then, a third method of fabricating a film-like light polarizing device is a method of obtaining polarization property by arranging intervals of fine wires so as to be not more than a wavelength of light to be polarized. A light polarizing film fabricated by this method is called a grid-type light polarizing film exhibiting an action as the light polarizing film if an interval d between the fine wires adjacent to each other is sufficiently shorter than a light wavelength $\lambda$, more specifically, if the fine wires are disposed at equal intervals of $d<\lambda/2$. The light polarizing film of this type has a function of reflecting a light component having an oscillation plane in the longitudinal direction of metal wires while transmitting a light component having an oscillation plane in a direction orthogonal to the longitudinal direction of the metal wires. Accordingly, the grid-type light polarizing film fabricated by the third method is contrary in operation principle to the film-like light polarizing device fabricated by the first method, and if two sheets of the grid-type light polarizing films are superimposed so as to cross each other at right angles, these act in effect like a mirror because all the components of incident light, having all the oscillation planes, are reflected. With the grid-type light polarizing film, transmittance of light can be enhanced, however, the intervals of electro-conductive fine wires need to be arranged so as to be not more than the wavelength of light to be polarized. Hence, the grid-type light polarizing film has so far been for use in infrared rays and so forth, having a long wavelength, but has seldom been used for visible rays because of difficulty with polarization of the visible rays.

By way of example of the grid-type light polarizing film described as above, in JP-9-090122A {Claims, para (0011) to (0021), FIG. 1}, there is disclosed a method of fabricating a grid-type light polarizing film of a construction where metal is distributed in a grid pattern inside dielectrics, or on the surface thereof, wherein two dielectrics are integrated with each other with the metal in the grid pattern interposed therebetween, and subsequently, the metal in the grid pattern in whole is hot drawn or rolled before fabrication.

However, since the method of fabricating the grid-type light polarizing film, disclosed in JP-9-090122A {Claims, para (0011) to (0021), FIG. 1}, requires heating up to a temperature causing the metal to expand, if a polymer substance is used for the dielectrics, the polymer substance will be in a melt condition or undergo depolymerization at such a temperature, so that it is impossible to fabricate the light polarizing film, and it is difficult to enlarge the area thereof.

Still further, in JP-2001-074935A {claims, para Nos, (0010) to (0014), FIGS. 1 and 2}, there is disclosed a grid-type light polarizing film of a construction comprised of metal portions and dielectric portions, anisotropic in shape, by forming a metal film on a transparent substrate, and drawing the substrate, and the metal film, at a temperature not higher than the melting point of the metal film.

However, with the method of fabricating the grid-type light polarizing film, disclosed in JP-2001-074935A {Claims, para Nos, (0010) to (0014), FIGS. 1 and 2}, as the transparent and soft substrate is uniformly drawn by drawing operation, an uniform drawing force acts on the metal film on top of the substrate, as well, so that metal wires formed of the metal film will not be regularly arranged at intervals on the order of a wavelength of light. More specifically, in the case of using a metal such as gold, excellent in ductility, the metal, together with the substrate, will be extended to thereby keep covering the substrate, and on the other hand, in the case of using a metal such as aluminum, poor in ductility, irregular cracking will occur, or the metal will peel off the substrate, so tat there exists a problem that a polarization effect is hardly obtainable.

Furthermore, as disclosed in JP-2003-529680A (Claims), there has recently been made public a method of fabricating a light polarizing film for a visible light region by forming fine grooves on a glass sheet with the use of a photo resist, and by vapor-depositing a metal thereon, however, with this method, fabrication cost becomes high because of a complex fabrication process involved, and moreover, it is practically impossible to increase an area to 5 cm² or larger.

Thus, with the above-described methods of fabricating the grid-type light polarizing film, only the grid-type light polarizing film with an area several cm² at the maximum has been obtained, and it has been impossible to obtain a film-like grid-type light polarizing device with an area larger than the area described as above. Hence, there has been a strong demand for a film-like grid-type light polarizing device large in area, with the polarization effect thereof enhanced ranging from a visible light region to an infrared region, and having a construction where there are alternately disposed electroconductors, and dielectrics, each having a width on the order of 1/10 of a wavelength in use, that is, in a range of several 10 nm to several μm, and a length not less than 10 times as long as the wavelength in use, that is in a range of several hundred nm to several hundred μm.

SUMMARY OF THE INVENTION

The inventor has continued various studies to overcome the problems, described from the fabrication point of view as above, with the conventional grid-type light polarizing film to thereby provide a method of continuously fabricating a grid-type light polarizing film which is high in performance, and is large in area, but can be fabricated at a low cost. As a result, the inventor has found out that electro-conductive fine wires having a width not longer than a wavelength of light or a radio wave can be arranged at intervals each sufficiently smaller than the wavelength of the light or the radio wave on a polymer by rolling techniques with the use of fine electro-conductive fibers extremely small in diameter and very long in comparison with the diameter, leading to successful completion of the present invention.

It is therefore a first object of the invention to provide a grid-type light polarizing film that is high in performance so as to be usable for light at a wavelength in a range of a visible light region to an infrared region, and is large in area, but can be fabricated at a low cost.

Further, a second object of the invention is to provide a method of continuously fabricating the grid-type light polarizing film by utilizing roll-drawing techniques.

Still further, a third object of the invention is to provide a grid type reflective optical device as a composite of the grid-type light polarizing films, for use in a wide bandwidth ranging from a visible light region and an infrared region to millimeter waves and microwaves.

The first object of the invention is attainable with the following configuration. More specifically, in accordance with a first aspect of the present invention, there is provided a light polarizing film of a structure comprising anisotropic electroconductive portions, and polymer dielectric portions, obtained by a process comprising the steps of:

applying a mixed liquid containing a fibrous electroconductive substance and at least one resin selected from a thermosetting resin, a photo-crosslinking resin and a chemical crosslinking resin, onto a transparent polymer film; and causing the fibrous electroconductive substance to be stiffened while being oriented, thereby fixing orientation thereof, wherein a length of the structure comprising the anisotropic electroconductive portions, and the polymer dielectric portions, in a shorter direction, is shorter than a wavelength of an incident light to be polarized while a length of the same, in a longer direction, is longer than the wavelength of the incident light to be polarized.

In this case, polarization property is dependent mainly on the size, concentration, dispersion condition, orientation condition, and so forth, with reference to the fibrous electroconductive substance, so that for the polymer film, thermosetting resins, photo-crosslinking resins, and chemical crosslinking resins, a well known material if transparent may be selected for use.

With the light polarizing film described in the foregoing, the length of the structure comprising the anisotropic electroconductive portions, and the polymer dielectric portions, in the shorter direction, preferably falls in a range of ½₀ to ½ of the wavelength of the incident light to be polarized while the length of the same, in the longer direction, is preferably not less than twice as long as the wavelength of the incident light to be polarized. In this case, if the length of the structure comprising the anisotropic electroconductive portions, and the polymer dielectric portions, in the shorter direction, is less than ½₀ of the wavelength of the incident light to be polarized, this will not be preferable because absorption or reflection of light, by the anisotropic electroconductive portions, will increase, resulting in deterioration of light transmittance while if the length of the structure comprising the anisotropic electroconductive portions, and the polymer dielectric portions, in the shorter direction, exceeds ½ of the wavelength, polarization property will deteriorate. Furthermore, if the length of the structure comprising the anisotropic electroconductive portions, and the polymer dielectric portions, in the longer direction, is less than twice as long as the wavelength, polarization property will deteriorate, and there is not limitation in theory to the length of the same, in the longer direction, as long as fabrication can be implemented, so that the length may be decided upon by the size of a light polarizing film.

In the case of an incident light to be polarized being a visible light, a visible light wavelength being in a range of about 400 to 700 nm, the length of the structure comprising the anisotropic electroconductive portions, and the polymer dielectric portions, in the shorter direction, may be in a range of 20 to 350 nm, and the length of the same, in the longer direction, may be not less than 800 nm, in which case the light polarizing film excellent in polarization property can be fabricated.

Further, in the case of an incident light to be polarized being infrared rays, an infrared wavelength being not less than about 700 nm, the length of the structure comprising the anisotropic electroconductive portions, and the polymer dielectric portions, in the shorter direction, may be in a range of 35 nm to 1 μm, and the length of the same, in the longer direction, may be not less than 10 μm, in which case the light polarizing film excellent in polarization property can be fabricated.

Still further, the fibrous electroconductive substance is preferably at least one substance selected from the group consisting of metal whiskers, electroconductive oxide whiskers, and carbon nano tubes.

Yet further, the light polarizing film according the invention may further comprise an antireflection film made up of dielectric multilayer film, having a double function of preventing exfoliation of the electroconductive portions, provided on the surface of the light polarizing film, with the anisotropic electroconductive portions formed thereon.

Further, the second object of the invention also is attainable by the following method. More specifically, in accordance with a second aspect of the present invention, there is provided a method of continuously fabricating a light polarizing film of a structure comprising anisotropic electroconductive portions, and polymer dielectric portions, wherein a length of the structure comprising the anisotropic electroconductive portions, and the polymer dielectric portions, in a shorter direction, is shorter than the wavelength of an incident light to be polarized while a length of the same, in a longer direction, is longer than the wavelength of the incident light to be polarized, said method comprising steps (1) to (3);

said step (1) being a process of continuously feeding a transparent polymer film;

said step (2) being a process of passing the transparent polymer film while applying a mixed liquid containing a fibrous electroconductive substance, and at least one resin selected from a thermosetting resin, a photo-crosslinking resin and a chemical crosslinking resin, onto the transparent polymer film, thereby orienting the fibrous electroconductive substance in one direction; and said step (3) being a process of causing the mixed liquid containing at least one resin selected from the thermosetting resin, the photo-crosslinking resin and the chemical crosslinking resin to be stiffened, thereby fixing orientation of the fibrous electroconductive substance.

With the method of continuously fabricating the light polarizing film according to the invention, described in the foregoing, the length of the structure comprising the anisotropic electroconductive portions, and the polymer dielectric portions, in the shorter direction, preferably falls in a range of $1/20$ to $1/2$ of the wavelength of the incident light to be polarized while the length of the same, in the longer direction, is preferably not less than twice as long as the wavelength of the incident light to be polarized. In this case, if the length of the structure comprising the anisotropic electroconductive portions, and the polymer dielectric portions, in the shorter direction, is less than $1/20$ of the wavelength of the incident light to be polarized, this will not be preferable because absorption or reflection of light, by the anisotropic electroconductive portions, will increase, resulting in deterioration of light transmittance while if the length of the structure comprising the anisotropic electroconductive portions, and the polymer dielectric portions, in the shorter direction, exceeds $1/2$ of the wavelength, polarization efficiency will deteriorate. Furthermore, if the length of the structure comprising the anisotropic electroconductive portions, and the polymer dielectric portions, in the longer direction, is less than twice as long as the wavelength, polarization efficiency will deteriorate, and there is not limitation in theory to the length of the same, in the longer direction, as long as fabrication can be implemented, so that the length may be decided upon by the size of a light polarizing film.

In the case of an incident light to be polarized being a visible light, a visible light wavelength being in a range of about 400 to 700 nm, the length of the structure comprising the anisotropic electroconductive portions, and the polymer dielectric portions, in the shorter direction, may be in a range of 20 to 350 nm, and the length of the same, in the longer direction, may be not less than 800 nm, in which case the light polarizing film excellent in polarization efficiency can be fabricated.

Further, in the case of an incident light to be polarized being infrared rays, an infrared wavelength being not less than about 700 nm, the length of the structure comprising the anisotropic electroconductive portions, and the polymer dielectric portions, in the shorter direction, may be in a range of 35 nm to 1 µm, and the length of the same, in the longer direction, may be not less than 10 µm, in which case the light polarizing film excellent in polarization efficiency can be fabricated.

Further, the fibrous electroconductive substance is preferably at least one substance selected from the group consisting of metal whiskers, electroconductive oxide whiskers, and carbon nano tubes. Still further, an antireflection film made up of dielectric multilayer film, having a double function of preventing exfoliation of the electroconductive portions may be provided on the surface of the light polarizing film, with the anisotropic electroconductive portions formed thereon.

Now, the third object of the invention is attainable by the following configuration. More specifically, in accordance with a third aspect of the present invention, there is provided a reflective optical device of a structure wherein two sheets of films each made up of the light polarizing film described in the foregoing are disposed such that respective electroconductive substances thereof cross each other at right angles.

In this case, the above-described light polarizing film of the grid type has a function of reflecting a light component having an oscillation plane in the longitudinal direction of electroconductive portions, and transmitting a light component having an oscillation plane in a direction orthogonal to the longitudinal direction of the electroconductive portions. Accordingly, if two sheets of the light polarizing films of the grid-type are superimposed one on the other so as to cross each other at right angles, there is obtained the reflective optical device acting in effect like a mirror by reflecting all components of incident light in predetermined region of wavelength, falling on all the oscillation planes thereof.

In this case, by selecting the dimensions of the structure comprising the anisotropic electroconductive portions, and the polymer dielectric portions, it is possible to reflect visible light, infrared rays, millimeter waves, and microwaves, or to transmit the visible light while reflecting the infrared rays, millimeter waves, and microwaves.

Thus, the present invention has advantageous effects described hereunder. More specifically, as described in detail hereinafter with reference to the embodiments of the invention, according to the first aspect of the invention, there is provides a film-like light polarizing device of the grid-type, large in area, excellent in polarization property, high in light transmittance, and usable in a range of a visible light region to an infrared region, with the use of fine electro-conductive fibers extremely small in diameter and very long in comparison with the diameter. Further, with some of the light polarizing films according to the invention, since the antireflection film made up of the dielectric multilayer film, having the double function of preventing the exfoliation of the electroconductive portions, may be provided on the surface of the light polarizing film, with the anisotropic electroconductive portions formed thereon, there can be obtained a light polarizing film capable of checking deterioration thereof, and enhancing light transmittance thereof.

Further, the invention in its second aspect provides the method of continuously fabricating the light polarizing film, whereby any of the light polarizing film according to the invention, large in area, can be fabricated by the rolling method at a low cost with ease.

Still further, the invention in its third aspect provides the reflective optical device large in area, and in a film-like form, capable of reflecting light or an electromagnetic wave at a predetermined wavelength. Accordingly, with the use of the reflective optical device in the front glass, side glass, and the like of an automobile, it is possible to protect a driver of the automobile from glare even if subjected to a high beam of an opposing car, or with the use of the reflective optical device in glass windows, and the like of a building, it is possible to reflect infrared rays, or electromagnetic waves longer in wavelength than infrared rays while permitting visible light to pass through the glass windows, and the like, so that not only the interior of the building becomes brighter but also heat insulation property of the building is enhanced.

PREFERRED EMBODIMENTS OF THE INVENTION

The best mode for carrying out the invention is described hereinafter with reference to preferred embodiments of the invention. It is to be pointed out, however, that the invention is not limited thereto, and that various changes and modifications may be made in the invention without departing from the spirit and scope of the following claims.

Embodiment 1

Figure 1:
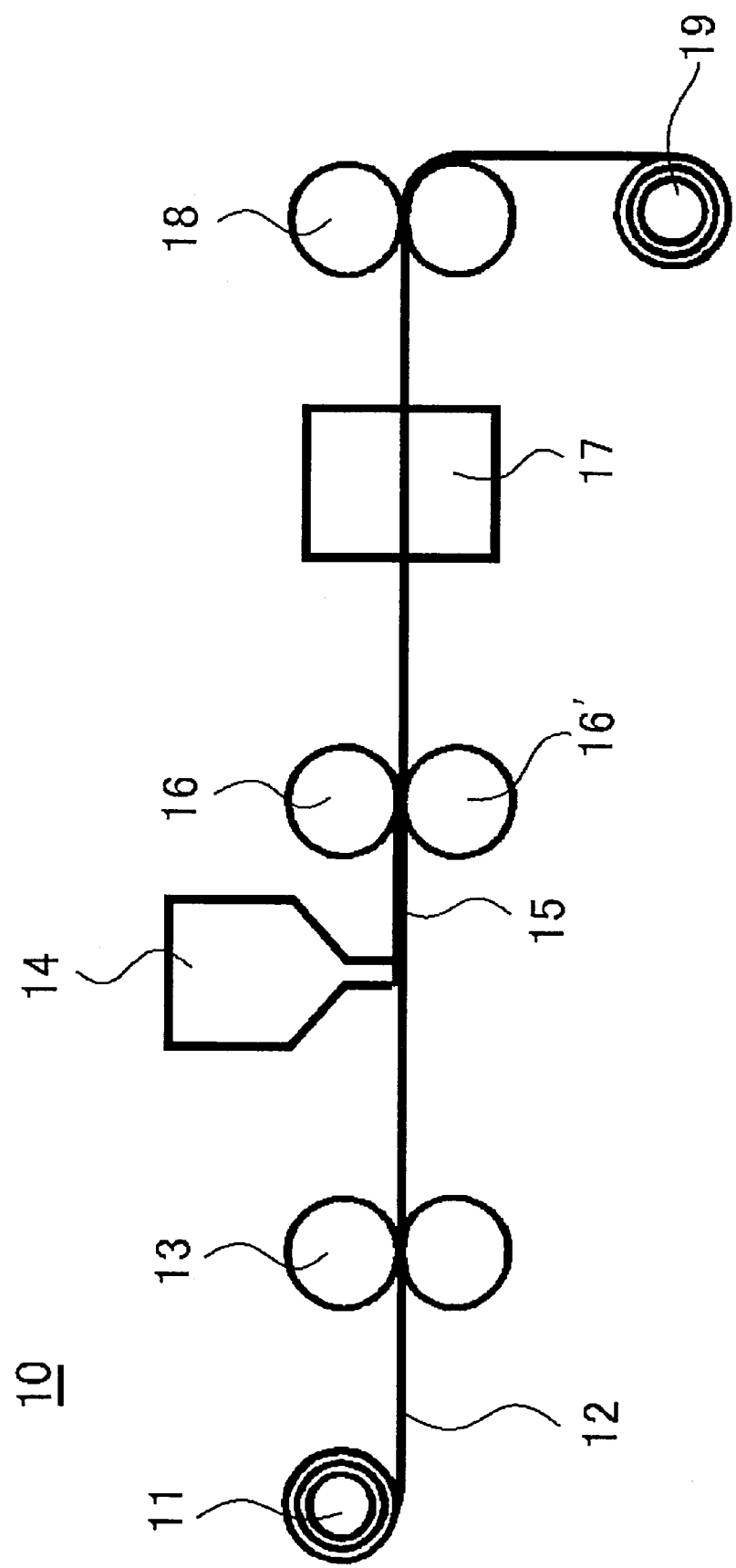
FIG. 1 is a schematic representation broadly showing a continuous fabrication system for a light polarizing film for use in carrying out an embodiment 1 of the invention.

In the case of an embodiment 1, a film-like light polarizing device was fabricated by causing electro-conductive ZnO whiskers to be fixed to the surface of a polyethylene terephthalate (PET) film with the use of a continuous fabrication system 10 for a light polarizing film, as shown in FIG. 1. First, a PET film 12 was fed from a PET film feed roll 11 via rolls 13, and a mixed liquid containing poly (vinyl alcohol), formaldehyde, ZnO whiskers after metal treatment, and water was applied to the surface of the PET film to a predetermined thickness with the use of a T-die 14, subsequently executing coating while applying shearing stress by varying peripheral velocity of an upper roll 16 of biaxial rolls from that of a lower roll 16' thereof, whereupon the ZnO whiskers were oriented in the longitudinal direction of the film. Thereafter, the film was dried and cured through a constant temperature cell 17 kept at a predetermined temperature, and rolls 18 to be subsequently taken up by a take-up roll 19, thereby obtaining a light polarizing film provided with the electro-conductive ZnO whiskers that were oriented in the longitudinal direction of the film. The light polarizing film was found very high in polarized light reflection property in an infrared region of a wavelength in a range of 1 to 10 μm, and upon measurement of reflectance for two sheets of the light polarizing films crossed at right angles, infrared light reflectance thereof was found at 99%. With the embodiment 1, when applying the mixed liquid containing the electro-conductive ZnO whiskers was applied to the surface of the PET film, the T-die method was adopted, however, the invention is not limited thereto, and other well known coating methods such as the doctor blade method, and so forth may be adopted instead.

Embodiment 2

Figure 2:
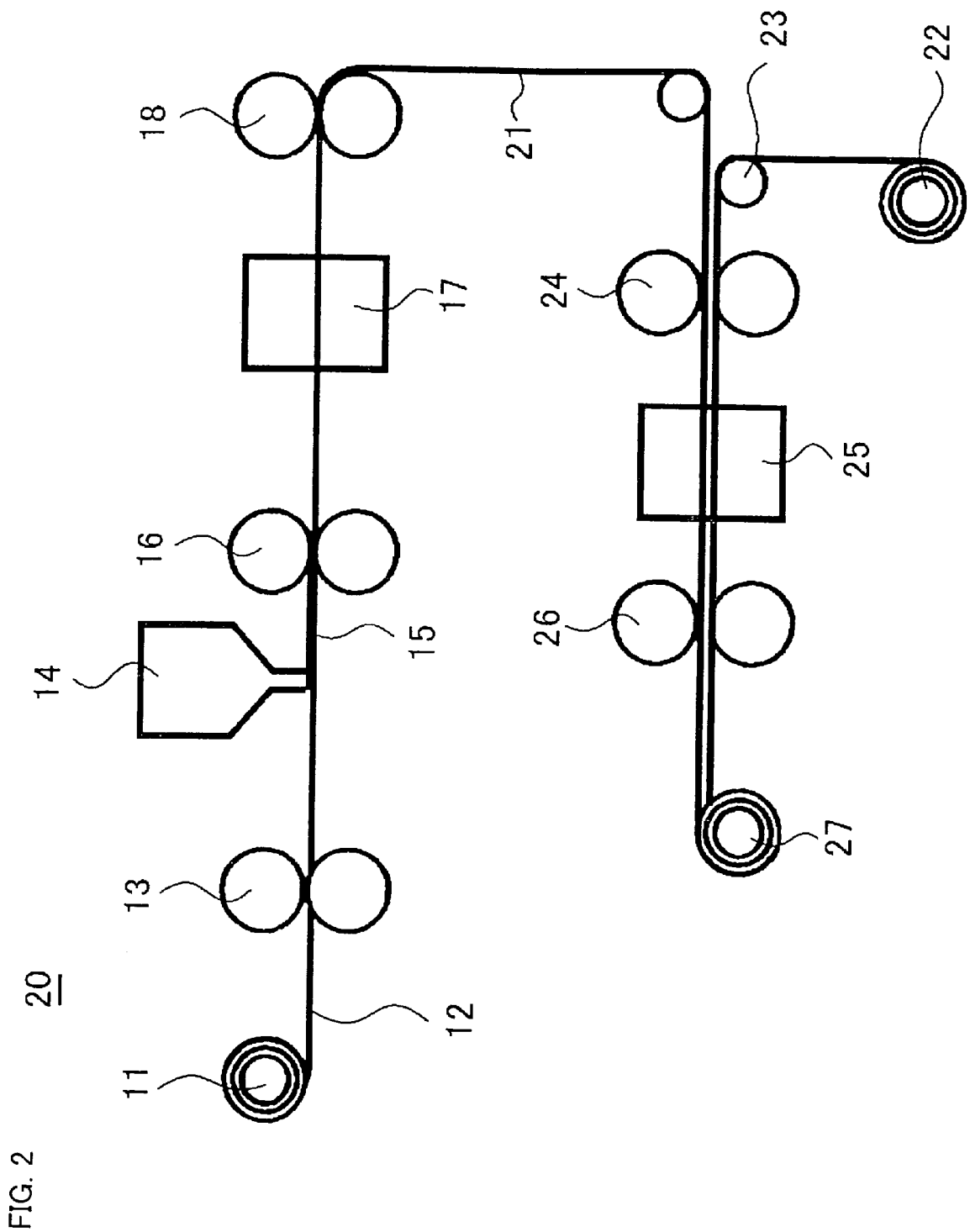
FIG. 2 is a schematic representation broadly showing a continuous fabrication system for a light polarizing film for use in carrying out an embodiment 2 of the invention.

In the case of an embodiment 2, a film-like light polarizing device provided with antireflection film on the surface of electro-conductive substance was fabricated by making use of the fabrication system shown in FIG. 1, used in carrying out the embodiment 1. FIG. 2 shows the configuration of a continuous fabrication system 20 for a film-like light polarizing device, used in carrying out the embodiment 2. In FIG. 2, constituent parts in common with those shown in FIG. 1 are denoted by like reference numerals, thereby omitting detailed description thereof.

First, the antireflection film fabricated by alternately laminating polymers of low refractive index, in plurality layers, to polymers of high refractive index, in plurality layers, fed from an antireflection film feed roll 22, was laminated via a roll 23 on a surface of a PET film 21 fabricated as with the embodiment 1 by drying and curing through a constant temperature cell 17, and rolls 18, provided with the electro-conductive substance composed of electro-conductive ZnO whiskers, coated thereon, to be subsequently bonded together through rolls 24. The antireflection film as newly added has a function of not only preventing reflection of light, but also preventing exfoliation of the ZnO whiskers bonded on the surface of the PET film by the agency of a strong pressing force applied by the rolls 24. Thereafter, bonding stability was added to the film by applying heat treatment thereto in a constant temperature cell 25 to be thereby taken up by a take-up roll 27 via rolls 26. It was confirmed that the film-like light polarizing device taken up by the take-up roll 27 was found to have a polarization effect equivalent to that for the light polarizing film according to the embodiment 1.

Embodiment 3

Figure 3:
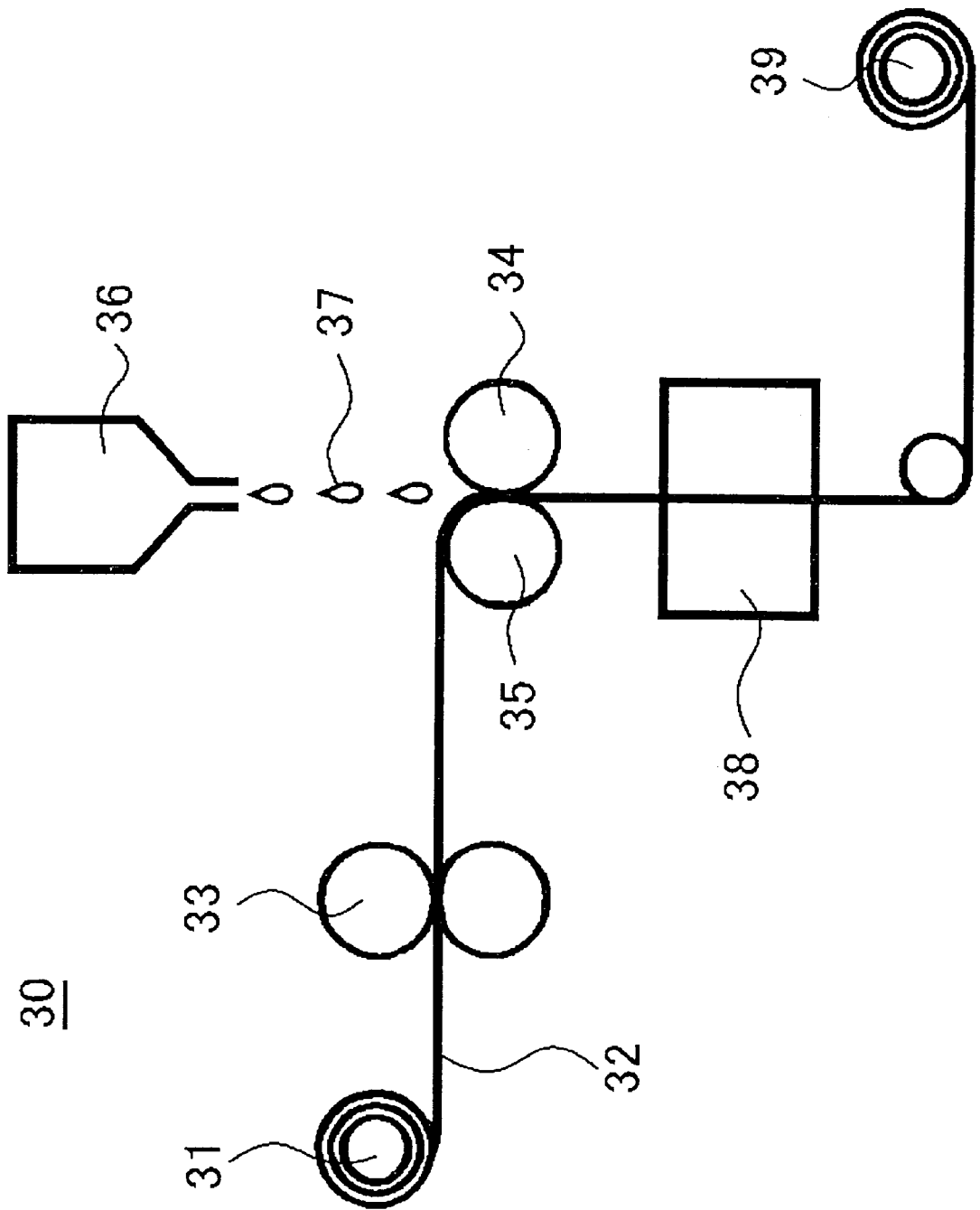
FIG. 3 is a schematic representation broadly showing a continuous fabrication system for a light polarizing film for use in carrying out an embodiment 3 of the invention.

In the case of an embodiment 3, a film-like light polarizing device was fabricated by causing carbon nano tubes to be fixed to the surface of a polycarbonate film with the use of a continuous fabrication system 30 for a light polarizing film, as shown in FIG. 3. First, a polycarbonate film 32 was fed from a polycarbonate film feed roll 31 to biaxial rolls 34, 35, differing in peripheral velocity from each other, via rolls 33. Subsequently, a photo resist solution 36 with commercially available carbon nano tubes mixed therein was dripped in the state of a droplet 37 from above the biaxial rolls 34, 35, differing in peripheral velocity from each other, thereby executing coating while applying shearing stress, whereupon the carbon nano tubes were oriented in the longitudinal direction of the film. Thereafter, the film was exposed to light with the use of an exposure apparatus 38 for fixing orientation to be subsequently taken up by a take-up roll 39. The degree of polarization of the film-like light polarizing device obtained as above was found at 98% at a visible light wavelength in a range of 420 to 700 nm.

What is claimed is:

1. A light polarizing film of a structure comprising anisotropic electroconductive portions, and polymer dielectric portions, obtained by a process comprising the steps of:

applying mixed liquid containing a fibrous electroconductive substance and at least one resin selected from a thermosetting resin, a photo-crosslinking resin and a chemical crosslinking resin, onto a transparent polymer film; and causing the fibrous electroconductive substance to be adhered on the film while being oriented, thereby fixing orientation thereof, wherein a length of the structure comprising the anisotropic electroconductive portions, and the polymer dielectric portions, in a shorter direction, is shorter than a wavelength of an incident light to be polarized while a length of the same, in a longer direction, is longer than the wavelength of the incident light to be polarized.

2. A light polarizing film according to claim 1, wherein the length of the structure comprising the anisotropic electroconductive portions, and the polymer dielectric portions, in the shorter direction, falls in a range of 1/20 to 1/2 of the wavelength of the incident light to be polarized while the length of the same, in the longer direction, is not less than twice as long as the wavelength of the incident light to be polarized.

3. A light polarizing film according to claim 2, wherein an incident light to be polarized is a visible light, and the length of the structure comprising the anisotropic electroconductive portions, and the polymer dielectric portions, in the shorter direction, is in a range of 20 to 350 nm, and the length of the same, in the longer direction, is not less than 800 nm.

4. A light polarizing film according to claim 2, wherein an incident light to be polarized is infrared rays, and the length of the structure comprising the anisotropic electroconductive portions, and the polymer dielectric portions, in the shorter direction, is in a range of 35 nm to 1 μm, and the length of the same, in the longer direction, is not less than 10 μm.

5. A light polarizing film according to claim 1, wherein the fibrous electroconductive substance is at least one substance selected from the group consisting of metal whiskers, electroconductive oxide whiskers, and carbon nano tubes.

6. A light polarizing film according to any one of claims 1 to 5 further comprising an antireflection film made up of dielectric multilayer film, having a double function of preventing exfoliation of the electroconductive portions, provided on the surface of the light polarizing film, with the anisotropic electroconductive portions formed thereon.

7. A method of continuously fabricating a light polarizing film of a structure comprising anisotropic electroconductive portions, and polymer dielectric portions, wherein a length of the structure comprising the anisotropic electroconductive portions, and the polymer dielectric portions, in a shorter direction, is shorter than the wavelength of an incident light to be polarized while a length of the same, in a longer direction, is longer than the wavelength of the incident light to be polarized, said method comprising steps (1) to (3);

said step (1) being a process of continuously feeding a transparent polymer film;

said step (2) being a process of passing the transparent polymer film while applying a mixed liquid containing a fibrous electroconductive substance, and at least one resin selected from a thermosetting resin, a photo-crosslinking resin and a chemical crosslinking resin, onto the transparent polymer film, thereby orienting the fibrous electroconductive substance in one direction; and said step (3) being a process of causing the mixed liquid containing at least one resin selected from the thermosetting resin, the photo-crosslinking resin and the chemical crosslinking resin to be stiffened, thereby fixing orientation of the fibrous electroconductive substance.

8. A method of continuously fabricating a light polarizing film according to claim 7, wherein the length of the structure comprising the anisotropic electroconductive portions, and the polymer dielectric portions, in the shorter direction, falls in a range of 1/20 to 1/2 of the wavelength of the incident light to be polarized while the length of the same, in the longer direction, is not less than twice as long as the wavelength of the incident light to be polarized.

9. A method of continuously fabricating a light polarizing film according to claim 8, wherein an incident light to be polarized is a visible light, and the length of the structure comprising the anisotropic electroconductive portions, and the polymer dielectric portions, in the shorter direction, is in a range of 20 to 350 nm, and the length of the same, in the longer direction, is not less than 800 nm.

10. A method of continuously fabricating a light polarizing film according to claim 8, wherein an incident light to be polarized is infrared rays, and the length of the structure comprising the anisotropic electroconductive portions, and the polymer dielectric portions, in the shorter direction, is in a range of 35 nm to 1 μm, and the length of the same, in the longer direction, is not less than 10 μm.

11. A method of continuously fabricating a light polarizing film according to claim 7, wherein the fibrous electroconductive substance is at least one substance selected from the group consisting of metal whiskers, electroconductive oxide whiskers, and carbon nano tubes.

12. A method of continuously fabricating a light polarizing film according to any one of claims 7 to 11 further comprising an antireflection film made up of dielectric multilayer film, having a double function of preventing exfoliation of the electroconductive portions, provided on the surface of the light polarizing film, with the anisotropic electroconductive portions formed thereon.

13. A reflective optical device of a structure wherein two sheets of films each made up of the light polarizing film according to any one of claims 1 to 5 are disposed such that respective electroconductive substances thereof cross each other at right angles.

14. A reflective optical device according to claim 13, wherein visible light, infrared rays, millimeter waves, and microwaves are reflected.

15. A reflective optical device according to claim 13, wherein visible light is transmitted while the infrared rays, millimeter waves, and microwaves are reflected.

* * * * *